United States Patent [19]

Döring

[11] 4,219,108
[45] Aug. 26, 1980

[54] THIRD RAIL SYSTEM FOR TRACK BOUND TRANSPORT MEANS

[75] Inventor: Hermann Döring, Neunkirchen, Fed. Rep. of Germany

[73] Assignee: Siemens Aktiengesellschaft, Munich, Fed. Rep. of Germany

[21] Appl. No.: 852,595

[22] Filed: Nov. 17, 1977

[30] Foreign Application Priority Data

Nov. 29, 1976 [DE] Fed. Rep. of Germany ....... 2654073

[51] Int. Cl.² .............................................. B60M 1/26
[52] U.S. Cl. .................................... 191/29 R; 174/86; 174/99 E; 191/44.1; 238/14.3; 238/14.4; 238/231; 339/9 E
[58] Field of Search ................ 238/10 E, 14.05–14.15, 238/141, 149, 175, 179, 260, 261, 231, 234; 191/22 R, 29 R, 32, 23 R, 23 A, 44.1; 339/9 E, 22 B; 174/68 B, 70 B, 88 B, 99 B, 99 E, 86

[56] References Cited

U.S. PATENT DOCUMENTS

| Re. 3,123 | 9/1868 | Wakeman | 238/179 X |
|---|---|---|---|
| 136,530 | 3/1873 | McIntyre | 238/261 |
| 842,545 | 1/1907 | Hayward | 238/14.4 |
| 934,960 | 9/1909 | Dreibuss et al. | 238/261 |
| 1,077,236 | 10/1913 | Weeber | 238/179 X |
| 3,790,725 | 2/1974 | Charamel et al. | 191/29 R |
| 3,892,299 | 7/1975 | Kilburg | 191/22 R X |
| 3,957,142 | 5/1976 | Devolle | 191/22 R X |

FOREIGN PATENT DOCUMENTS

| 2148944 | 4/1973 | Fed. Rep. of Germany | 191/29 R |
| 2606609 | 7/1977 | Fed. Rep. of Germany | 339/9 E |

Primary Examiner—Randolph A. Reese
Attorney, Agent, or Firm—Kenyon & Kenyon

[57] ABSTRACT

In a third rail system for electric railroads, double T shaped third rails are used, the web of which has an internal longitudinal slot to receive the guide projections of support insulators and for the space saving mounting of electrical and mechanical connecting parts of fixed and/or expansion joints. With this slot design, good heat transfer and at the same time, a large mechanical moment of inertia are obtained.

3 Claims, 8 Drawing Figures

THIRD RAIL SYSTEM FOR TRACK BOUND TRANSPORT MEANS

BACKGROUND OF THE INVENTION

The invention relates to a third rail system for track bound transport means, especially electric railroads, in general and more particularly to an improved third rail system.

Third rail systems in which at least one third rail of double T shaped cross section, on which a collector shoe slides, is supported on a slide bed provided at support insulators, and in which fixed joints and expansion joints are provided at predetermined spacings are known. In these systems, the third rail is held in a prong-like slide bed.

SUMMARY OF THE INVENTION

It is an object of the present invention to provide a third rail system in which third rails can be accommodated in less space than heretofore.

To solve this problem, the web of the third rail has an internal longitudinal slot beginning at its base for guiding the third rail at projections in the slide bed of the support insulators and for receiving connecting parts of the fixed and/or expansion joints as well as connecting parts for feeding in the power.

The invention permits accommodating all connecting and mounting parts within the space that is defined by the projection of the sliding surface. It is therefore possible, if several live rails are arranged, to get along with a minimum of space. By providing the rail webs with the slot, a more favorable heat removal and thus, higher load capacity of the third rail, is obtained. In addition, larger moments of inertia are obtained for the same cross section.

BRIEF DESCRIPTION OF THE DRAWINGS

FIG. 4b is a cross sectional view of the joint of FIG. 4a.

FIG. 4c is a longitudinal section of the joint of FIG. 4a.

FIG. 5b is a partial cross section of FIG. 5a.

DETAILED DESCRIPTION OF THE INVENTION

Figure 1:
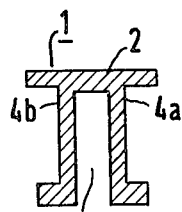
FIG. 1 is a cross section of a third rail according to the present invention.

The third rail shown in FIG. 1 has a double T shaped cross section and has a sliding surface 2. It has an internal longitudinal slot 3 extending from the base side of the rail so that a double web with individual webs 4a and 4b results.

Figure 2:
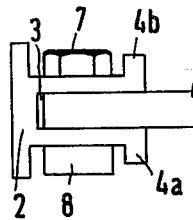
FIG. 2 is a view of a third rail feed point.

As can be seen in FIG. 2, the slot 3 receives connecting parts, e.g., connecting bars 5, via which electric energy is fed through the wall 6 of a track support of a suspension railroad. Bolts 7 which are brought through the two webs 4a and 4b of the third rail 1 and are screwed into a counterplate 8, connect the third rail 1 to the connecting bars 5.

Figure 3:
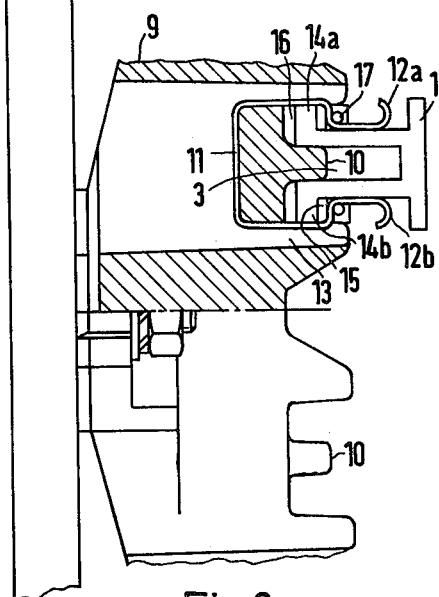
FIG. 3 illustrates a third rail with part of a support insulator which is designed for holding several lines.

Support insulators 9 (FIG. 3) which are arranged at spacings hold the third rail 1. Each support insulator 9 has projections 10 for guiding the third rails 1, which are placed on the projections 10 so that the projections are disposed within the slots. The third rail 1 is held in place by U shaped brackets 11 which are brought through cutouts 13 in the support insulator 9. The spring legs 12a and 12b of brackets 11 extend around base parts 14a and 14b of the rails for this purpose. Pins 17 prevent the legs of the bracket from jumping out. To obtain good sliding properties, glide pieces 15 are inserted between the legs 12a and 12b of the bracket 11 and the base parts 14a and 14b of the rail.

Elastic glide pieces 16 are also arranged between the base parts 14a and 14b of the rail and the support insulator 9.

In the rail mounting described, a sliding seat which is free of play is obtained which could otherwise be obtained only with difficulty using bolts.

Individual third rail sections are connected together at predetermined spacings by fixed joints and expansion joints.

Figure 4A:
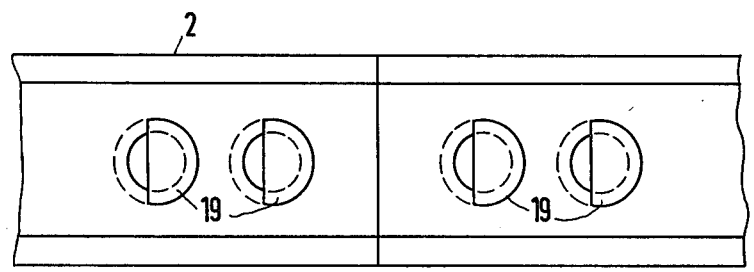
FIG. 4a shows a fixed joint of a third rail in a side elevation.
Figure 4B:
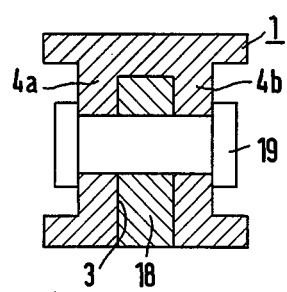
Figure 4C:
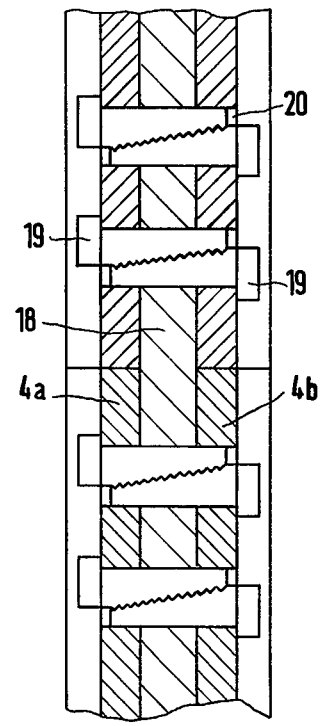

FIGS. 4a and 4b show a fixed joint, in which two third rail ends to be connected are secured by a strap (or fish plate) 18 placed in the slot 3. Two serrated wedges 19 are inserted through each of the two holes 20 in the webs 4a and 4b of the third rail 1 and the fish plate 18, one from each side, and are tightened (FIGS. 4a, 4b and 4c) for the connection. In this manner, seperate electrical connections can be dispensed with since the rail ends are pressed together by the wedge construction.

Figure 5A:
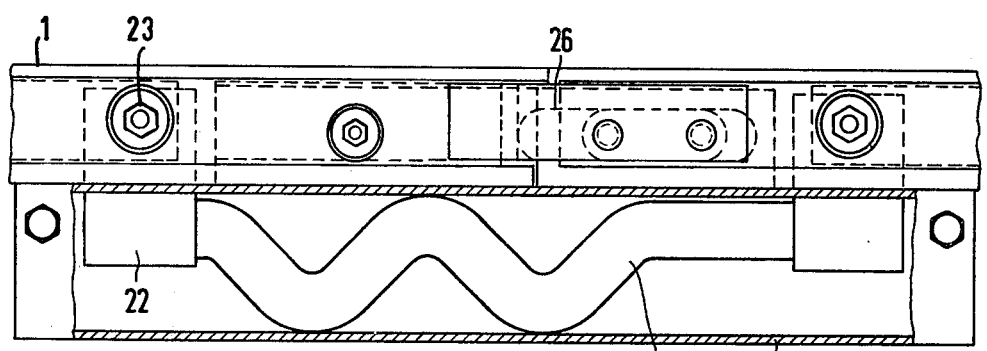
FIG. 5a illustrates an expansion joint of a third rail in a side elevation.
Figure 5B:
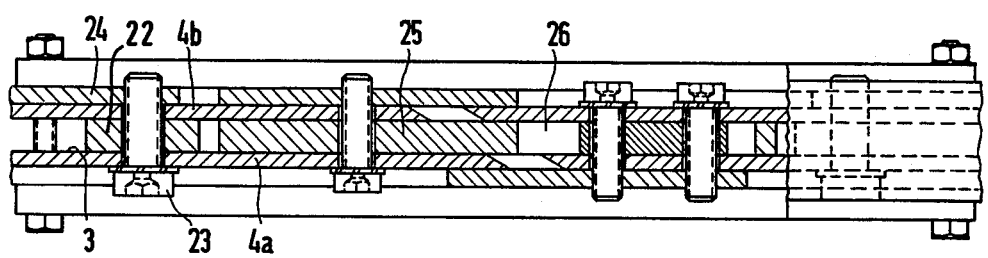

In the expansion joint according to FIGS. 5a and 5b, electrical jumpers which have strap-like cable lugs 22 at their ends are used. These are placed in the slots 3 of the two rail ends and are connected by bolts 23 and straps 24 to the webs 4a and 4b of the third rail 1. Between the two strap-like cable lugs 22, a fish plate 25 with an elongated hole 26 is arranged in the slot 3 of the third rail 1 and bolted to the webs 4a and 4b of the third rail 1. To protect the electrical jumpers 21, which are made from flexible cables, a protective box 27 of insulating material is provided.

I claim:

1. In a third rail system for a track bound transport means having at least one third rail of double "T" shaped cross section on which a collector shoe slides, the third rail being supported on a slide bed with support insulators and containing fixed joints and expansion joints at predetermined spaces, the improvement comprising:
   (a) the third rail having a web with an internal longitudinal slot extending from the base of said third rail for receiving mechanical connecting parts and electrical connecting and joining parts;
   (b) an electrical jumper at each expansion joint, said electrical jumper having strap-like cable lugs on each end, said strap-like cable lugs being disposed in the slots and bolted to webs of the two third rail ends being joined;
   (c) a single fishplate at each of said expansion joints disposed entirely within the slot of said third rail between said strap-like cable lugs, said fishplate being slidably secured to the webs of the two third rails being joined, and
   (d) the support insulators including projections disposed in the slot for guiding said third rail.

2. The improvement of claim 1 and further including cutouts in said insulators extending longitudinally at positions on each side of said projections, and U-shaped brackets extending through said cutouts, the legs of said brackets being spring loaded and extending around the base portions of said rail to hold said rail in place.

3. In a third rail system for a track bound transport means having at least one third rail of double "T" shaped cross section and a sliding surface on which a collector shoe slides, the third rail being supported on a slide bed with support insulators and containing fixed joints and expansion joints at predetermined spaces, the improvement comprising:

(a) the third rail having a web with an internal longitudinal slot extending from the base of said third rail to the underside of the sliding surface for receiving mechanical connecting parts and electrical connecting and joining parts;

(b) an electrical jumper at each expansion joint, said electrical jumper having strap-like cable lugs on each end, said strap-like cable lugs being disposed in the slots and bolted to webs of the two third rail ends being joined;

(c) a single fishplate at each of said expansion joints disposed entirely within the slot of said third rail between said strap-like cable lugs, said fishplate being slidably secured to the webs of the two third rails being joined, and (d) the support insulators including projections disposed in the slot for guiding said third rail.

* * * * *